United States Patent
Agrawal et al.

(10) Patent No.: US 6,490,259 B1
(45) Date of Patent: Dec. 3, 2002

(54) ACTIVE LINK LAYER AND INTRA-DOMAIN MOBILITY FOR IP NETWORKS

(75) Inventors: Prathima Agrawal, New Providence, NJ (US); Jyh-Cheng Chen, Flanders, NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/512,514

(22) Filed: Feb. 24, 2000

(51) Int. Cl.[7] .................................................. H04Q 7/00
(52) U.S. Cl. .......................... 370/331; 370/338; 455/436
(58) Field of Search ................................. 370/328, 331, 370/332, 338, 401, 312, 349; 455/436, 437, 443

(56) References Cited

U.S. PATENT DOCUMENTS

| | | | | |
|---|---|---|---|---|
| 5,875,183 A | * | 2/1999 | Nitadori ..................... | 370/328 |
| 5,949,780 A | | 9/1999 | Gopinath .................... | 370/389 |
| 5,987,011 A | * | 11/1999 | Toh ............................ | 370/331 |
| 6,041,358 A | * | 3/2000 | Huang et al. .............. | 370/331 |

OTHER PUBLICATIONS

"Fast and Scalable Wireless Handoffs in Support of Mobile Internet Audio", R. Caceres and V. N. Padmanabhan; Mobile Networks and Applications 3 (1998) pp. 351–363.

"A Cellular IP Testbed Demonstrator", A. T. Campbell, J. Gomez, S. Kim, Paul, T. Sawada, C-Y. Wan, A. G. Valko, Turanyi; IEEE, 0–7803–590 4–6/99/$10.00 1999, pp. 145–148.

"IP Mobility Support", Memo to Network Working Group, Standards Track Category, from C. Perkins, Editor, IBM, Oct. 1996; 79 pages.

* cited by examiner

Primary Examiner—Chau Nguyen
Assistant Examiner—D. Trinh
(74) Attorney, Agent, or Firm—Joseph Giordano

(57) ABSTRACT

Active packets are utilized by a mobile terminal in a wireless network to manage the micro-mobility which includes both link layer mobility and intra-domain mobility of a wireless connection as the mobile terminal moves from one cell to another in a domain of a network. Active packets convey instructions and data so nodes in the domain may update forwarding tables maintained by each of the devices in the domain. The forwarding table entries contain both link layer entries and network layer entries to efficiently handle roaming by the mobile terminal.

15 Claims, 13 Drawing Sheets

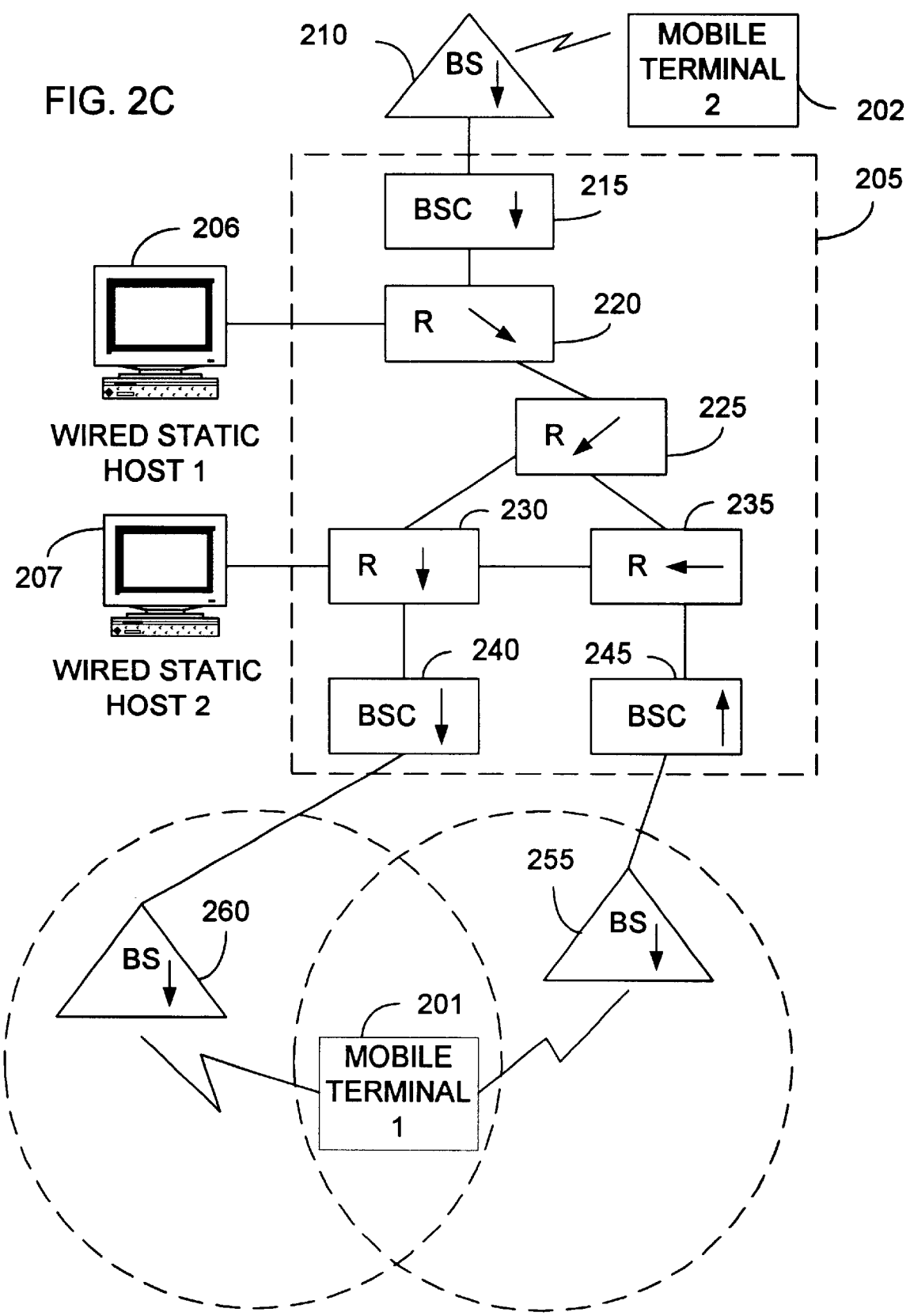

ACTIVE LINK LAYER AND INTRA-DOMAIN MOBILITY FOR IP NETWORKS

BACKGROUND OF THE DISCLOSURE

1. Field of the Invention

This invention relates generally to mobile communications, and, more particularly, to methodologies and concomitant circuitry for applying active networking to manage the mobility of IP (Internet Protocol) networks.

2. Description of the Background

The Internet is expected to see continued growth in supporting personal and commercial services. Currently the Internet Protocol (IP) provides services to end terminals that are attached to wired networks. With the proliferation of mobile and wireless services and as more users disconnect from their fixed access points and become mobile, there is an increasing need to adapt IP to the wireless domain.

The wireless environment is dynamic in nature due to the mobility of the end terminals and the variability of the over-the-air channel. Moreover, the mobile wireless environment is much more dynamic than the traditional wireline environment. The uncertainties of the wireless and mobile environments call for an increased level of adaptability. For more robust communications, mobility management must maintain connectivity when the mobile terminal is moving and/or the transmission capabilities are varying. Successful installation of real-time and non-real-time applications across network elements with differing capabilities and over a dynamic wireless channel requires mobility management to have flexible and self-adaptive functionality.

The IP network was originally designed without considering the possibility that devices such as mobile terminals may move from one place to another. Thus, the IP address of a mobile terminal represents both the "identification" and "location" of a terminal. The IP address specifies to which network and subnet the terminal can attach. This address, expressed in terms of the Open Systems Interconnection layer model, is used in the network layer (also referred to as the IP layer, or layer 3) to find the terminal and to route packets to the terminal. The assumption, however, breaks in today's highly mobile environment, in which the identification and location of terminals must be decoupled.

Ideally, mobility management can be done in any layer. However the network layer is a more natural place to deal with IP mobility because it is the layer where packets are routed. Currently, mobility in IP networks is supported by the Mobile IP protocol. Mobile IP identifies a mobile terminal (MT) by its permanent home IP address, regardless of its current point of attachment in the communication system such as, for example, the Internet. While away from its home network, the MT acquires a "care-of" address—an address that reflects its current point of attachment—from an agent, which is referred to as a "foreign agent". The care-of address can also be acquired by other means, such as a DHCP server. The MT then provides to its "home agent" in the home network the "care-of" address. Mobile IP uses the home agent to redirect (by encapsulation) packets destined for the home address to the "care-of" address. By this way, all IP packets sent to the mobile station (MT) will be received by home agent, which then forwards them to foreign agent or to the MT directly. Mobile IP hides the change of IP address and therefore the change of the MT's location. Higher layers do not need to know the location of the MT and can continue to use the same IP address to reach the MT.

Mobile IP is a simple and scalable way to deal with the mobility in network layer. However, the redirection by the home agent causes Mobile IP to be inefficient (triangular routing) and not robust (relies on a home agent and sometimes on a foreign agent). To deal with the triangular routing problem, mobility support in IPv6 has moved in the direction of end-to-end location updates using the facilities of IPv6 to send binding updates. In addition to sending its binding to its home agent, the MT can send the binding to the corresponding host communicating with it. When sending a packet, the corresponding host checks its binding for the destination address. The packet is then sent directly to the care-of address without going through the home agent if the binding is found. This improves routing efficiency. However, this still requires communications via the home agent when the corresponding host does not know the current location of the MT, or when both nodes can be mobile simultaneously, or if the MT wants to hide its location. More important, IPv6 is not widely deployed currently.

Although Mobile IP is simple, scalable, and suitable for inter-domain mobility, it is now realized that Mobile IP may not be suitable for "intra-domain" mobility, especially when a MT moves frequently. As indicated above, Mobile IP is inefficient due to triangular routing. In addition, the registration of care-of address with the home agent when the MT moves to a new subnet will cause too many messages if the MT moves frequently between subnets. This registration from the MT to the home agent causes extra delay too. Besides, the IP network relies on ARP (address resolution protocol) to map the IP address to the MAC address (that is, the layer 2 or link layer address). The broadcast-and-reply nature of ARP wastes bandwidth and causes extra delay. Although cache memory can reduce the use of ARP, it is somewhat ineffective when the MT moves frequently. Moreover, all of the problems related to a roving mobile terminal outlined above are exaggerated for real-time services that require very fast handoff.

Active networks are a class of networks that can be leveraged to provide mobility management adaptability. An active network allows intermediate nodes to perform computations specified by packets or modify in-transit packets. This technique allows programs to be executed or structures to be reconfigured in the network based on the data contained in the packets traversing the network. Thus, this technique injects a degree of intelligence and flexibility into current network elements that can be configured and programmed to suit a variety of needs. Moreover, this type of processing can be customized on a per-user or per-application basis.

A recent disclosure relating to active networks is the subject matter of U.S. Pat. No. 5,949,780 issued to Gopinath. The subject matter of this patent relates to methodologies and concomitant circuitry for coalescing intelligence with communications in a switching node. The inventive aspects of '780 suggestions related to program execution in the switch based upon the following actions/events (an event triggers an action which, in turn, generates a desired response): the state of the program itself; the state of resources composing the switch; external control inputs serving the switch; other programs executing in the switch; data (packets) received over other ports of the switch; or combinations of these actions/events. In addition, the inventive aspects covered an implementation in conjunction with a switch wherein a new program may be downloaded to the switch, and then this new program may be executed, together with other stored programs if necessary, based upon data incoming to a port as well as any or all the foregoing actions/events.

In accordance with the broad method aspect of '780, a communications service is implemented with a program stored in a processing unit having input and output ports to receive and transmit messages—each message is composed of, canonically, a control tag and payload information. For each port, data is retrieved and then parsed by the program to determine if the control tag and/or the payload information are to be modified. Based upon the parsing, the incoming message can be sent to one or more other ports, or further processed by the program or other stored programs to produce desired actions.

The prior art is devoid of teachings or suggestions relating to generating an active packet to foster the fast handoff of a mobile terminal as the terminal moves from one cell to another in a subnet, and from a subnet to another subnet within an administrative domain, i.e., intra-domain mobility.

SUMMARY OF THE INVENTION

Shortcomings and limitations of the prior art are obviated, in accordance with the present invention, by a methodology and concomitant circuitry wherein, generally, an active packet transmitted from a mobile terminal fosters execution of a mobility management process which propagates throughout the fixed communications network to suitably handle the mobility management.

Broadly, in accordance with one method aspect of the present invention, a method for managing the intra-domain mobility, both "within a subnet" and "across subnets", of a wireless mobile terminal in a given domain of a network, the domain being served by a plurality of base stations and the mobile terminal initially being in communication with one of the base stations, includes: (a) transmitting an active packet from the terminal to a new one of the base stations; and (b) executing a mobility process in the domain in response to the active packet being received by the new one of the base stations.

BRIEF DESCRIPTION OF THE DRAWINGS

The teachings of the present invention can be readily understood by considering the following detailed description in conjunction with the accompanying drawings, in which:

FIGS. 2A, 2B, 2C, and 2D depict an arrangement for mobility management to handle a roaming mobile terminal in accordance with the present invention;

To facilitate understanding, identical reference numerals have been used, where possible, to designate identical elements that are common to the figures.

DETAILED DESCRIPTION

Figure 1A:
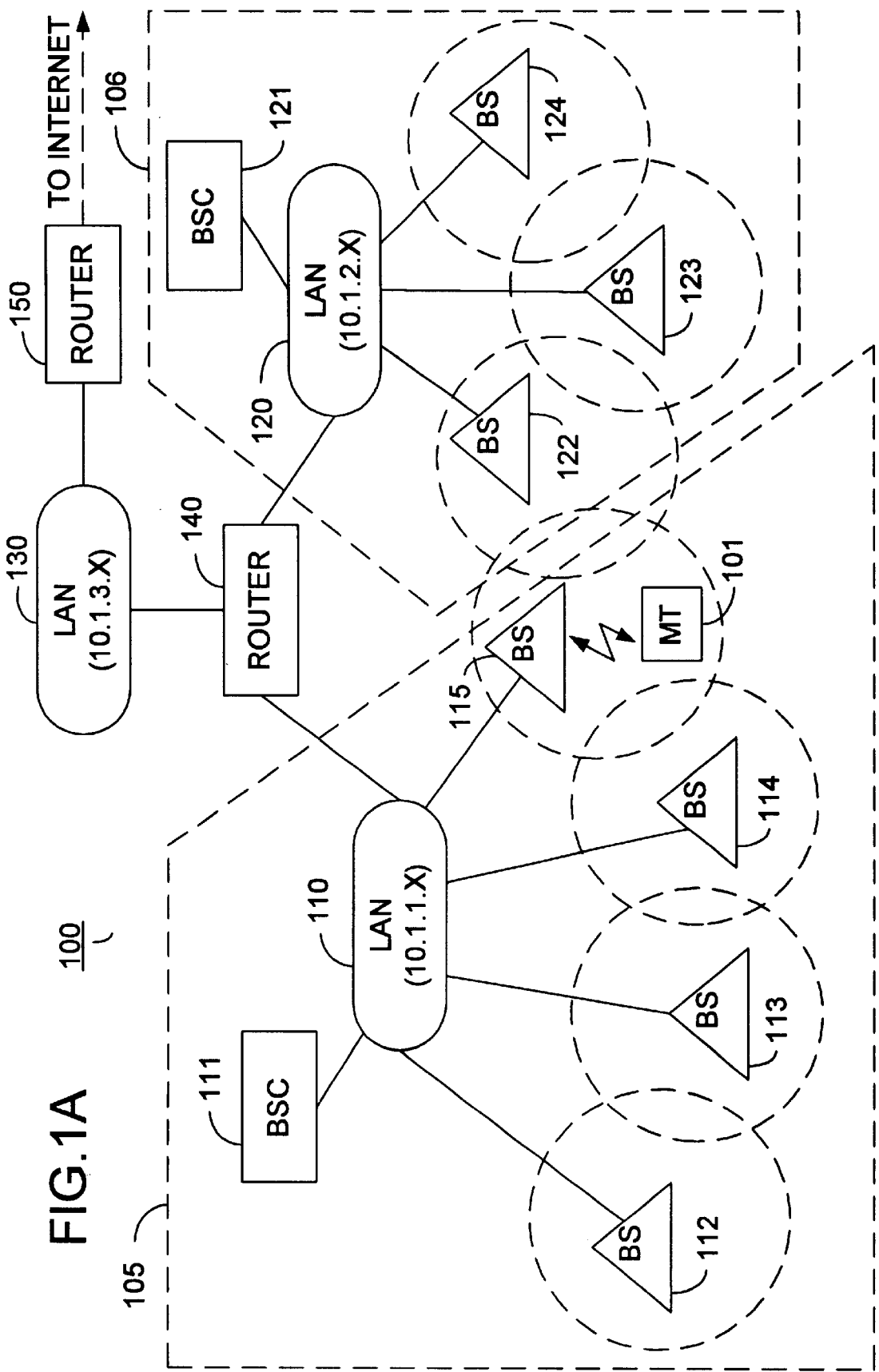
FIG. 1A depicts an illustrative system architecture for which mobility management is required.

Mobility for purposes of the present invention is based upon a two-level mobility management technique. It is recognized that Mobile IP can effectively provide the so-called "macro-mobility" or "inter-domain mobility" in the wide area. However, in the local area, the methodology and concomitant system in accordance with the present invention, referred to as ALIM (Active Link Layer and Intra-Domain Mobility for IP Networks), focuses on the "micro-mobility" or "intra-domain mobility" to engender efficient mobility management and fast handoff protocol in the local area. ALIM leverages active networks. ALIM is based on the IP layer (layer 3) for "across subnets" mobility as well as the link layer (layer 2) for "within subnet" mobility. However, ALIM is general enough for most multiple access protocols in the link layer. Since ALIM is a mobility protocol compatible with the IP layer, ALIM can work with any protocols and applications in higher layers.

To fully describe the principles of operation, it is elucidating to present certain terminology that will make the detailed description concrete, but without loss of generality. As alluded to above, Mobile IP can provide so-called "macro-mobility" over a wide area in which the mobile terminal moves from one domain to another domain (inter-domain), but it is generally inefficient for "micromobility" when the mobile terminal moves within a subnet and from one subnet to another subnet (intra-domain) in a local area. The term "subnet" is well-defined in IP, and is used herein in the sense defined by an IP address, which generally has the form "w.x.y.z" (e.g., 10.1.3.14), wherein "w.x" is the network address (10.1), "y" (3) is the subnet address for the given network, and "z" (14) is the host address for the given network/subnet, such as a mobile terminal or a base station. An example of a domain as used in the description of the invention may be couched in terms of the IP address, as follows: the collection of three subnets having IP addresses "w.x.1.z", "w.x.2.z", and "w.x.3.z", respectively, define a domain. Thus, one notion of domain is that "w.x" identifier remains the same, but "y" is a variable (of course, "z" is also variable since it defines devices in the network).

The terms "inter-domain" and "intra-domain" are not defined by IP, but are generally understood in the art, as now exemplified. The term "inter-domain" is used to connote sub-systems of an overall system that have different entities responsible for separately administering each respective sub-system. On the other hand, "intra-domain" connotes a sub-system of an overall system wherein the same entity is responsible for administering the sub-system. Thus, as per the example above, the same entity has oversight responsibility for the sub-system "w.x", and all devices having the prefix "w.x" are treated as intra-domain devices.

In view of the above discussion, certain generalizations can apply. Intra-domain implies operation across subnets, but without the necessity for separate administration. Inter-domain also implies operation across subnets, but across domains as well, with the need for formal administration of each domain by a different entity. Accordingly, in ALIM, intra-domain mobility is "across subnets" mobility, but inside the same administrative domain, such as a Local Area Network (LAN). In terms of "w.x.y.z", "y" definitely changes, and even "w.x" can change in certain situations, as long as the administration is the same. Inter-domain mobility is "across subnets" and "across administrative domains", such as a Wide Area Network (WAN). In terms of "w.x.y.z", "y" definitely changes, "x" oftentimes changes, and "w" may also change. The ALIM system handles both link layer mobility ("within subnet") and "intra-domain" mobility ("across subnet") in a single-entity setting for mobile terminals that number in the hundreds to thousands. The "inter-domain" mobility is handled by Mobile IP. ALIM is not scalable for "inter-domain" mobility which must handle millions of terminals world-wide. ALIM is faster than Mobile IP in applications involving "intra-domain" mobility. The fast handoff in ALIM is particularly suitable for real-time applications.

From another viewpoint, using the Open Systems Interconnection layer model, wherein the "physical" layer is the bottom layer, the "data link" layer (called the "link" layer hereafter) is above the "physical" layer, and the "network" layer (also the "IP" layer hereafter) is above the "link" layer, then micro-mobility involves both the "IP" layer as well as the "link" layer and macro-mobility involves only the "IP" layer. Techniques exist in the art for micro-mobility, but they typically are not publicly available due to their proprietary nature.

To further exemplify the meaning of micro-mobility, reference is made to FIG. 1A wherein communication system 100 depicts a typical architecture and components useful in describing the principles of operation of the intra-domain mobility management technique.

With reference to FIG. 1A, system 100 is composed of: (a) three local area networks (LANs) 110, 120, and 130; (b) router 140 interconnecting the three LANs; (c) router 150 coupling LAN 130 with, for example, the Internet; (d) Base Station Controller (BSC) 111 coupled to LAN 110 and BSC 121 coupled to LAN 120; (e) Base Stations (BSs) 112, 113, 114, and 115 coupled to LAN 110; (f) BSs 122, 123, and 124 coupled to LAN 120; and (g) mobile terminal (MT) 101 initially homing on BS 115. Each base station serves a cellular region, shown as a dashed circle about each base station. For optimal service, cellular regions overlap, as shown. (It is well-known that a LAN may be configured in many different ways; for example, as a bus network, a ring network, a star network, a tree network, and so forth, so the architecture of FIG. 1A is not limiting).

LAN 110 is shown as having IP address "10.1.1.X", LAN 120 has IP address "10.1.2.X", and LAN 130 has IP address "10.1.3.X". More specifically, for instance, all nodes (or, equivalently, devices) connected to LAN 110 have addresses in the form "10.1.1.X", where "X" is the host ID for each node. In addition, the nodes connected to LAN 110, namely BSC 111 and BSs 112–115, form one subnet designated 105 in FIG. 1A. Moving from one base station to another base station (e.g., BS 115 to BS 114) in LAN 110 results in a "link" layer handoff. Similarly, the devices that are coupled to LAN 120, namely, BSC 121 and BSs 122–124, form another subnet 106. Moving, for example, from LAN 110 to LAN 120 (e.g., from BS 115 to BS 122) exemplifies "across subnet" handoff, that is, intra-domain handoff.

It is assumed in FIG. 1A that generally the base stations have overlapped regions in which MT 101 can switch to a "promiscuous mode" whereby MT 101 is able to transmit and receive signals from multiple BSs. Generally, as MT 101 moves from one cell to another, the SNR (signal-to-noise ratio) for each BS as measured by MT 101 varies. Suppose initially that MT 101 is communicating with BS115. When MT 101 moves away from BS 115, the SNR pertaining to BS 115 decreases. At a certain point in its movement, MT 101 decides, based upon a pre-determined threshold, that the over-the-air link to its current BS 115 is poor when the SNR is below the threshold (e.g., 40% of the original SNR ratio). MT 101 then turns to its promiscuous mode and uses a so-called "scanning algorithm" to search for another BS, which for FIG. 1A is assumed to be BS 122. (The scanning algorithm is conventional to a mobile service environment, and it is carried out at the "physical" layer level). If the search request is successful, MT 101 can roam to the new BS. Otherwise the MT scans for another BS. Once MT 101 locates a new base station, it then turns off its promiscuous mode and communicates with the new base station. Typically, MT 101 locates new BS 122 when the SNR to BS 122 is a prescribed amount above the pre-determined threshold (e.g., 50%).

To explain the next phase of the operation, certain notation must be covered. The network interface card (NIC) of devices, including mobile terminals, BSs, BSCs, and routers are assigned a unique identifier by the manufacturer of the particular NIC (a router may actually have more than one identifier because it may have more than one NIC); for instance, for a MT the identifier of its NIC is called the "MT MAC ID", where MAC is the acronym for Medium Access Control; the MAC ID or, equivalently, Address is utilized at the "link" layer. The format for the MAC ID for each device usually has 48 bits which can be formatted as follows: "B1:B2:B3:B4:B5:B6", where B1, B2, . . . is each one byte. Also, since each byte can be treated as containing two 4-bit nibbles, the MAC ID is such that each nibble can be expressed in hexadecimal. Thus, a typical MT MAC ID might be: "08:00:20:03:F6:42" or, equivalently, "8:0:20:3:F6:42".

Besides the MAC ID, a MT is also assigned a unique IP address which is utilized by the "IP" layer. Other devices of FIG. 1A also have unique IP addresses; for instance, each BS has a specified IP address, as well as each BSC and Router (R). In conformance with the LAN IP addresses, it is supposed that the IP address of MT 101 is 10.1.1.10, BS 114 has IP address 10.1.1.4, BS 115 has IP address 10.1.1.5, BS 122 has IP address 10.1.2.2, BSC 111 has IP address 10.1.1.2, and BSC 121 has IP address 10.1.2.2.

Figure 1B:
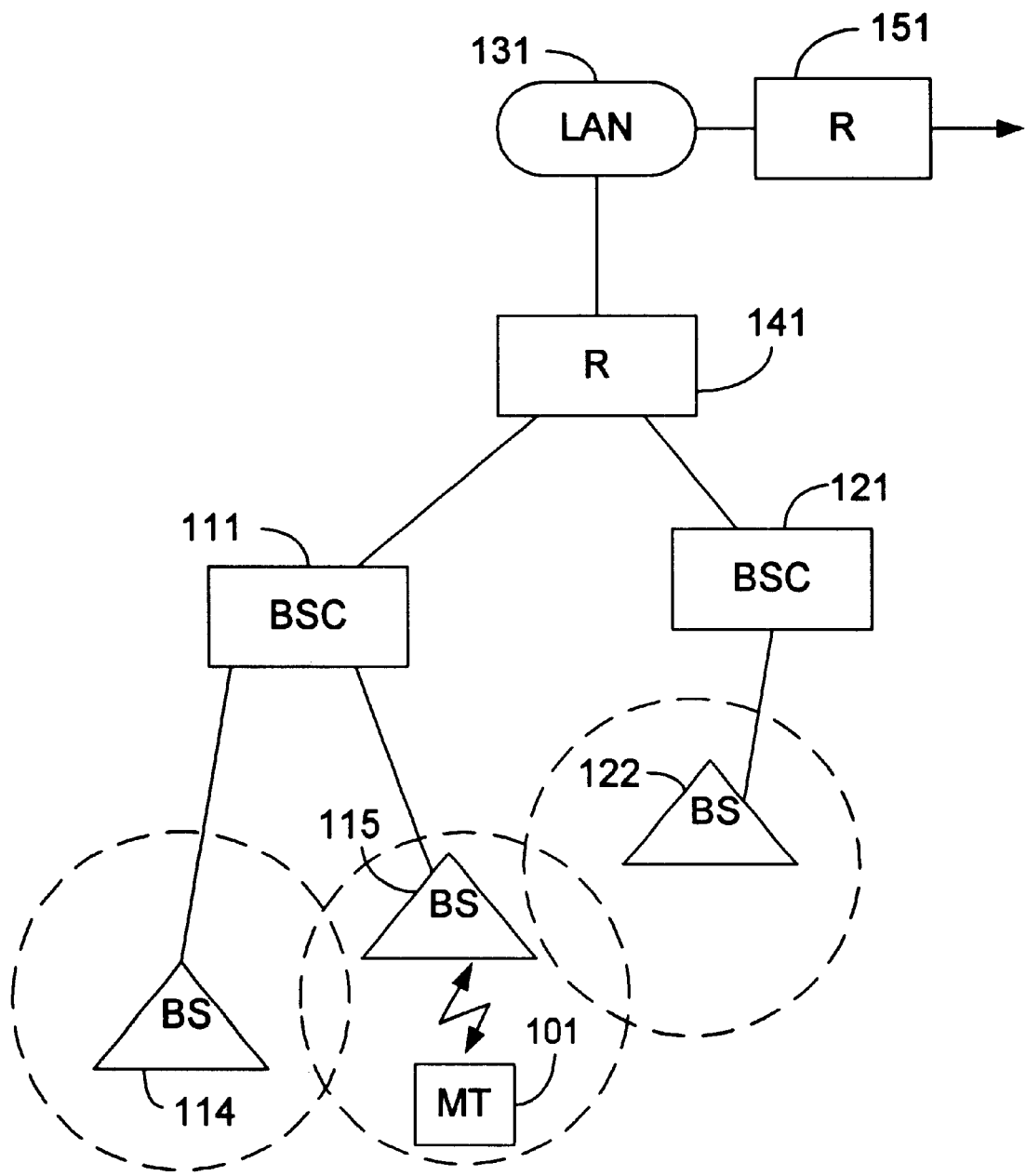
FIG. 1B depicts another illustrative system architecture for which mobility management is required.

The MAC ID and IP Address of the devices (MT, BS, BSC, and R) are then used to fill-in tables, referred as Forwarding Tables. For purposes of specificity but without limitation, the architecture of FIG. 1B is considered. Then the forwarding table relating to MT 101 for BS 115 is exemplified by Table 1 and the forwarding table relating to MT 101 for BSC 111 is exemplified by Table 2, presuming that MT 101 initially homes on BS 115 and that BS 115 has MAC ID 82:10:10:4:EE:79.

TABLE 1

| MT MAC ID | MT Home IP Address | Forwarding MAC ID | Wireless Port | Time Stamp |
|---|---|---|---|---|
| 8:0:20:3:F6:42 | 10.1.1.10 | NIL | 1 | 2000.02.03.16.21.32.18 |
| . . . | . . . | . . . | . . . | . . . |

TABLE 2

| MT MAC ID | MT Home IP Address | Forwarding MAC ID | Wireless Port | Time Stamp |
|---|---|---|---|---|
| 8:0:20:3:F6:42 | 10.1.1.10 | 82:10:10: 4:EE:79 | NIL | 2000.02.03.16.21.32.18 |
| ... | ... | ... | ... | ... |

As shown, there are five fields in each forwarding table (FT) row (each row is called a forwarding table entry): (a) the MAC IDs of MTs; (b) the IP address (permanent address or home address) of MTs; (c) the forwarding MAC ID of devices to which IP packets destined for MTs should be forwarded; (d) the wireless port if the device is the BS which the MT can communicate directly by wireless port (otherwise, the field is NIL); and (e) a Time Stamp copied from an original active packet—a process soon to be described. The Time Stamp has, for example, the format "year-month-day-hour-minute-second-millisecond".

Table 1 depicts that any IP packet arriving at BS 115 and bound for MT 101, as identified by its IP address 10.1.1.10, is not forwarded to any other device, but is transmitted directly over a wireless port (e.g., wireless port 1 as per Table 1) since MT 101 homes on BS 115. On the other hand, any communication received by BSC 111 destined for MT 101, upon look-up of the IP address 10.1.1.10 in column two and the corresponding forwarding address in column three of Table 2, is forwarded to BS 115 (MAC address 82:10:10:4:EE:79). When the communication reaches BS 115, the communication is forwarded directly to MT 101, as per the entries in Table 1.

It is necessary to distinguish two modes of the communication in accordance with the present invention. The first mode of communication has been exemplified above wherein the mobile terminal is presently not roaming and is homing on a given base station; in this mode, the focus of the communication is the proper routing of IP packets. The next mode of communication, now to be discussed in detail, focuses upon updates to the forwarding table in each device as the mobile terminal roams. This mode is characterized by the propagation of active packets processed by the link layer or MAC layer of each device.

Figure 6:
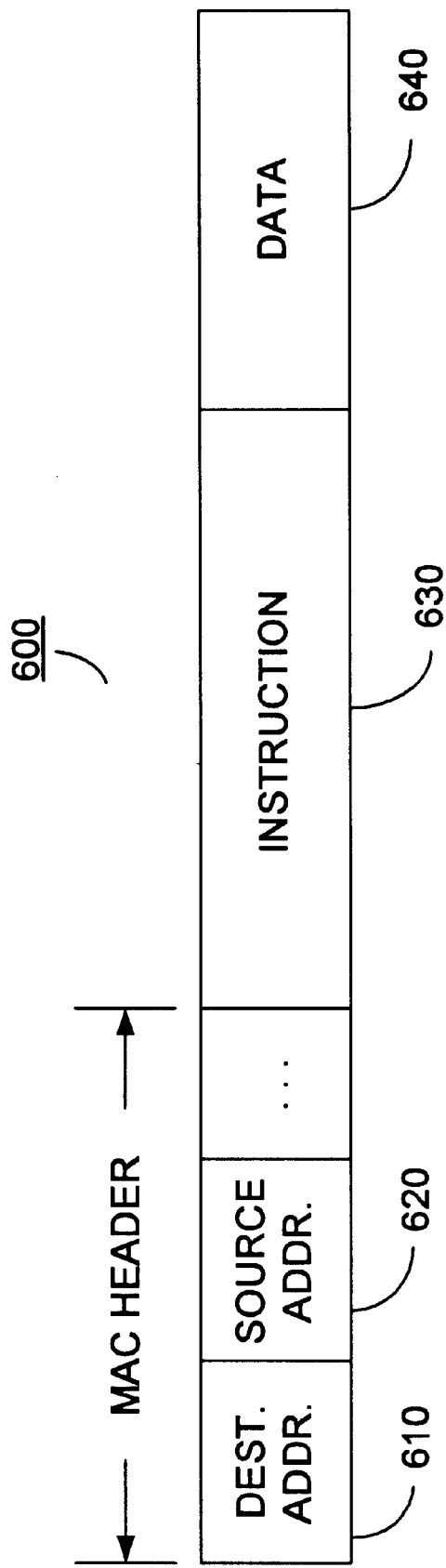
FIG. 6 is a layout of an active packet, including the instruction portion and the data portion.

Continuing now with the discussion of roaming whereby MT 101 now homes on BS 122 rather than BS 115, after MT 101 receives permission from new BS 122 to associate (typically MT 101 is still in the overlap area), MT 101 sends an active packet to BS 122—as used herein the terminology "active packet" means a layer 2 or MAC packet, the layout of which is shown in more detail shortly (FIG. 6). The instructions carried by the active packet instruct BS 122 to update its forwarding table entry corresponding to the mobile terminal. The program portion of the active packet then instructs BS 122 to replicate the active packet and forward the duplicated active packets to all adjacent BSs, BSCs, and routers in the same domain. These active packets also carry the original packet generation time (Time Stamp), which indicates what time the original packet was generated in MT 101, as well as the MT MAC ID. All devices also replicate and forward the active packets to their adjacent BSs, BSCs, and routers in the same domain. When the replicated active packets arrive at a BS, BSC, or router, the carried program instructions conveyed by the replicated active packet also instructs the BS/BSC/router to check the time stamp in its forwarding table entry relating to MT 101. If the time stamp field in the forwarding table is different with the one in the active packet, a check is then made on the forwarding MAC ID field. If the forwarding MAC ID is different too, the forwarding MAC ID field in the device is then updated. If the time stamp is the same as the time stamp in the active packet or the forwarding MAC ID field is same as the one in the active packet, this active packet instructs the BS/BSC/router that no update is necessary and no more packets will be forwarded from this device. The forwarding of packets is terminated at this point because this device has already been visited by an active packet or it is not necessary to change the forwarding MAC ID. Thus the forwarding table accurately reflects the current position of the mobile terminal. This termination technique eliminates excessive packet duplication and forwarding, but still ensures that all devices in the network have the current forwarding address of the MT. Thus new routes through the network can be established to reach the MT. When the old BS, namely BS 115, receives the active packet propagated over the network, BS 115 changes its corresponding entry from the wireless port to the forwarding MAC ID in its Table 1. The old BS 115 then realizes that the MT has roamed to new BS 122. The old BS 115 then sends a notice to MT 101 to instruct MT 101 to turn off its promiscuous mode. The old BS 115 therefore is not directly communicating with the MT anymore. In effect, at this point in the operation, MT 101 has moved out of the range of the old BS 115.

The new forwarding table for BS 115 is given in the table below (that is, Table 3 is the updated version of Table 1—to compile this table, it is presumed that BSC 111 of FIG. 1B has MAC ID IF:2:15:7:17:8):

TABLE 3

| MT MAC ID | MT Home IP Address | Forwarding MAC ID | Wireless Port | Time Stamp |
|---|---|---|---|---|
| 8:0:20:3:F6:42 | 10.1.1.10 | 1F:2:15: 7:17:8 | NIL | 2000.02.03.16.25.30.10 |
| ... | ... | ... | ... | ... |

Figure 2A:
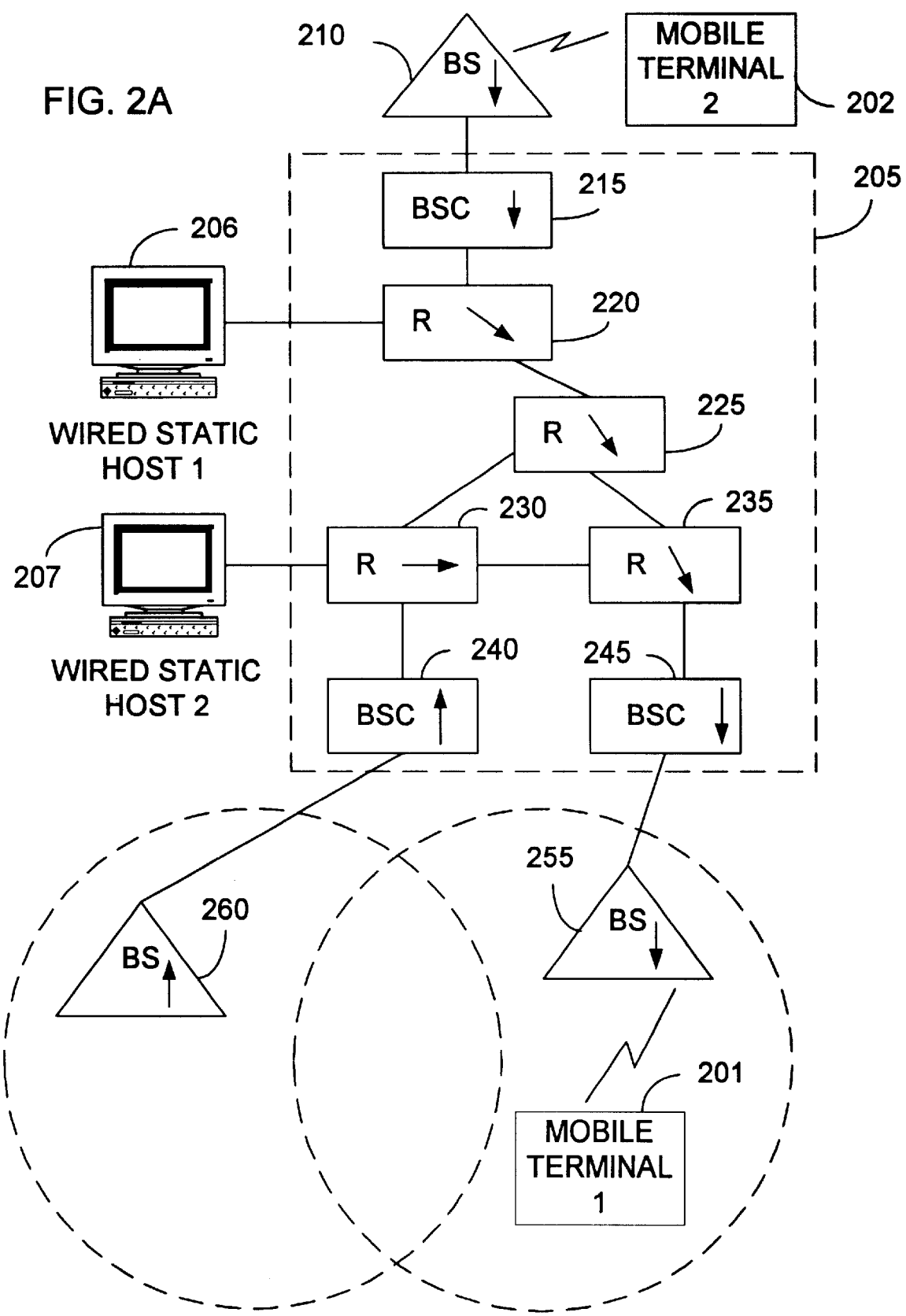
Figure 2B:
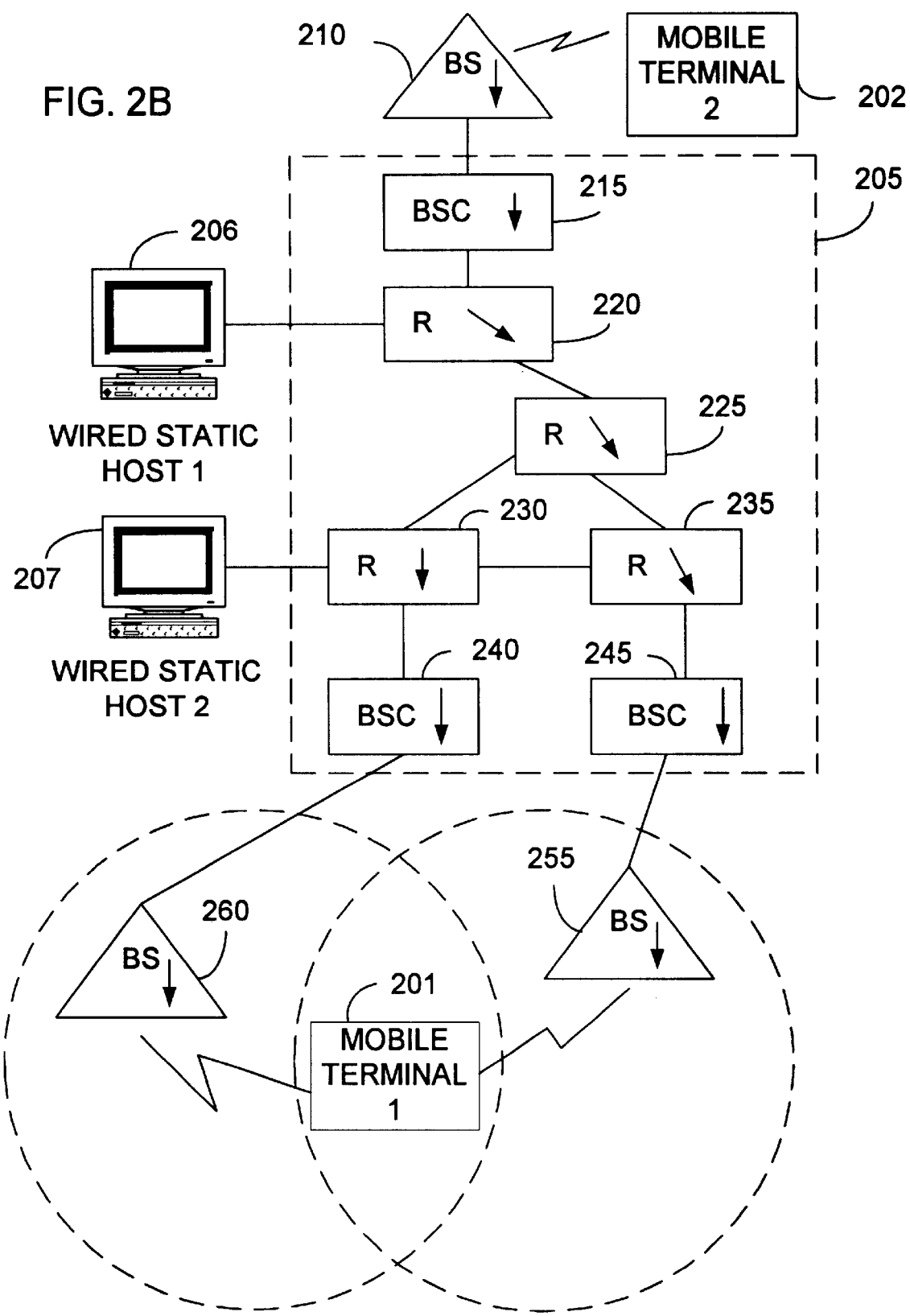

The sequence of FIGS. 2A–D shows an example of how this "active address propagation" technique operates in another network architecture (this architecture is merely exemplary and not limiting). FIG. 2A indicates the routes from MT 202, wired static host 206, and wired static host 207 to MT 201 before handoff. The routes are pointed to by the forwarding address stored in each BS, BSC, and router. FIG. 2B shows the case when MT 201 just enters the overlap region of BSs 260 and 255, and switches to its promiscuous mode. Since the active packet may not have propagated to all routers, BSCs and BSs yet, it is possible that only a few of the forwarding addresses have been updated. Therefore, only some routes have been recreated.

By way of notation, the "arrows" in the various devices/components of FIG. 2A show the "forwarding direction" for a communication received by the device/node that is destined for MT 201. Accordingly, the "down" arrow in BSC 245 indicates that an incoming message for MT 201 is passed to BS 255. Similarly, for example, the "up" arrow in BS 260 points to BSC 240 as a forwarding device that will handle a communication destined for MT 201.

Figure 2D:
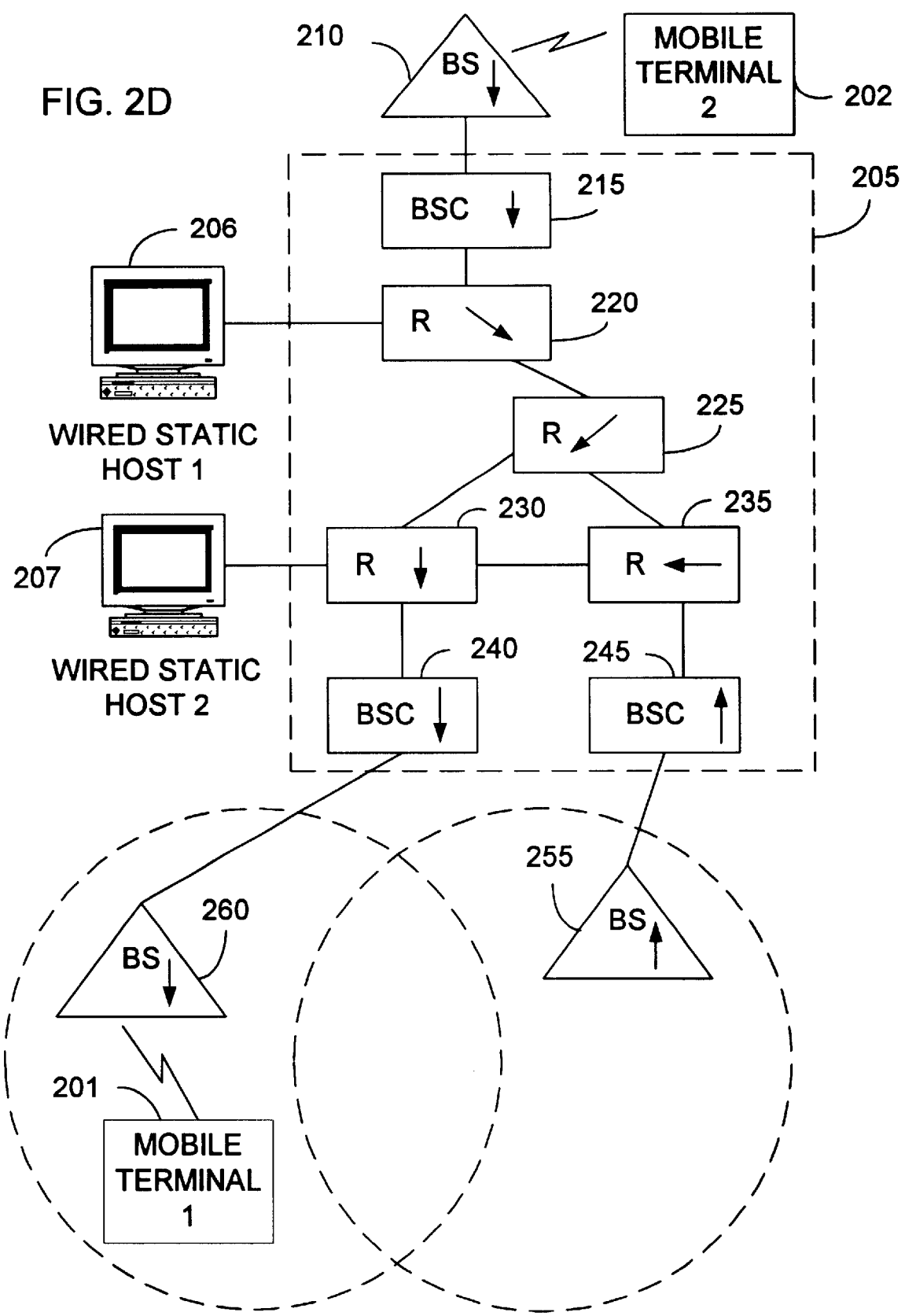

In FIG. 2B, only BSC 240 and router 230 have been reached by an active packet emitted by BS 260 in response to MT 201 now homing on BS 260. Wired static host 207 routes through BS 260 to reach MT 201; the other devices still follow the old forwarding addresses. FIG. 2C indicates that all forwarding addresses have been updated except the old BS, namely, BS 255; moreover, MT 201 is still in its promiscuous mode. Finally, FIG. 2D shows that all forwarding addresses are updated, and all communication paths are rerouted, and MT 201 turns off its promiscuous mode. Depending on the coverage of the overlap region, the moving speed of a mobile terminal, and the propagation delay, it is possible that the updates are done partially, as those in FIGS. 2B and C, but MT 201 has already reached the new serving cell. This may require the retransmission of information-bearing packets. However with today's high-speed routers and backbone networks, this is a rare occurrence. To prevent this from happening, the network planner should deploy enough of an overlap region for handoff.

Also note that all source hosts connecting to the fixed (shown as encompassed by dashed box 205 in FIGS. 2A–D), and wireless networks know the new location of MT 201. There is no need to reroute the path for each individual source node. The triangle routing of the conventional Mobile IP is eliminated and route optimization is done automatically. In addition, the new forwarding address is updated by the first arriving packet, which means the new path may be the one with least congestion or shortest path. The new route pointed to by the forwarding address is the fastest path in the current network condition. Also ALIM can be used for link layer handoff (within IP subnet) or intra-domain handoff (across IP subnet). In order to attach to a new subnet, the MT needs to get a new IP address (care-of address). This can be done by, for example, the foreign agent or DHCP server. ALIM deals with address binding and leaves registration and configuration to other protocols. Although ALIM does not use care-of address in the forwarding table, it is necessary for Mobile IP for inter-domain mobility.

It is instructive for the sake of specificity, given the description to this point, to re-visit the differences between the ARP (Address Resolution Protocol) technique discussed in the Background Section and the inventive subject matter. Currently in the Internet, the IP layer uses ARP to map the IP address in the network layer to MAC address in link layer. The method of ARP is summarized as follows. Whenever a node receives an IP packet and decides upon the new IP address to forward the IP packet, this node broadcasts an ARP packet to determine which of the network nodes "owns" this IP address. The node which owns this IP address then replies with its MAC address. Therefore, the sender knows how to map the IP address to MAC address for the link layer. However, this broadcast-and-reply causes inefficiency and unnecessary delay. It may also congest the network. Therefore schemes such as caching the mapping in memory have been deployed. In a highly mobile environment, the broadcast-and-reply ARP may still necessary because the entry of the MT may not be in the cache memory yet, or the mapping in cache may not reflect the correct information. With the inventive methodology described herein, the ARP can be replaced by simply looking up the forwarding table. Whenever an IP packet comes in, instead of using ARP, the node searches the forwarding table by using the permanent/home IP address field. If the port associated with this entry is not NIL, it means this node can communicate with the destination by a wireless port directly. Therefore, the MT MAC ID in the table is the MAC address for link layer. Otherwise, the forwarding MAC ID in the table is the MAC address for the link layer. Compared with ARP, the forwarding table look-up approach is simple and fast.

Flow Diagram of Processing by a Mobile Terminal

Figure 3:
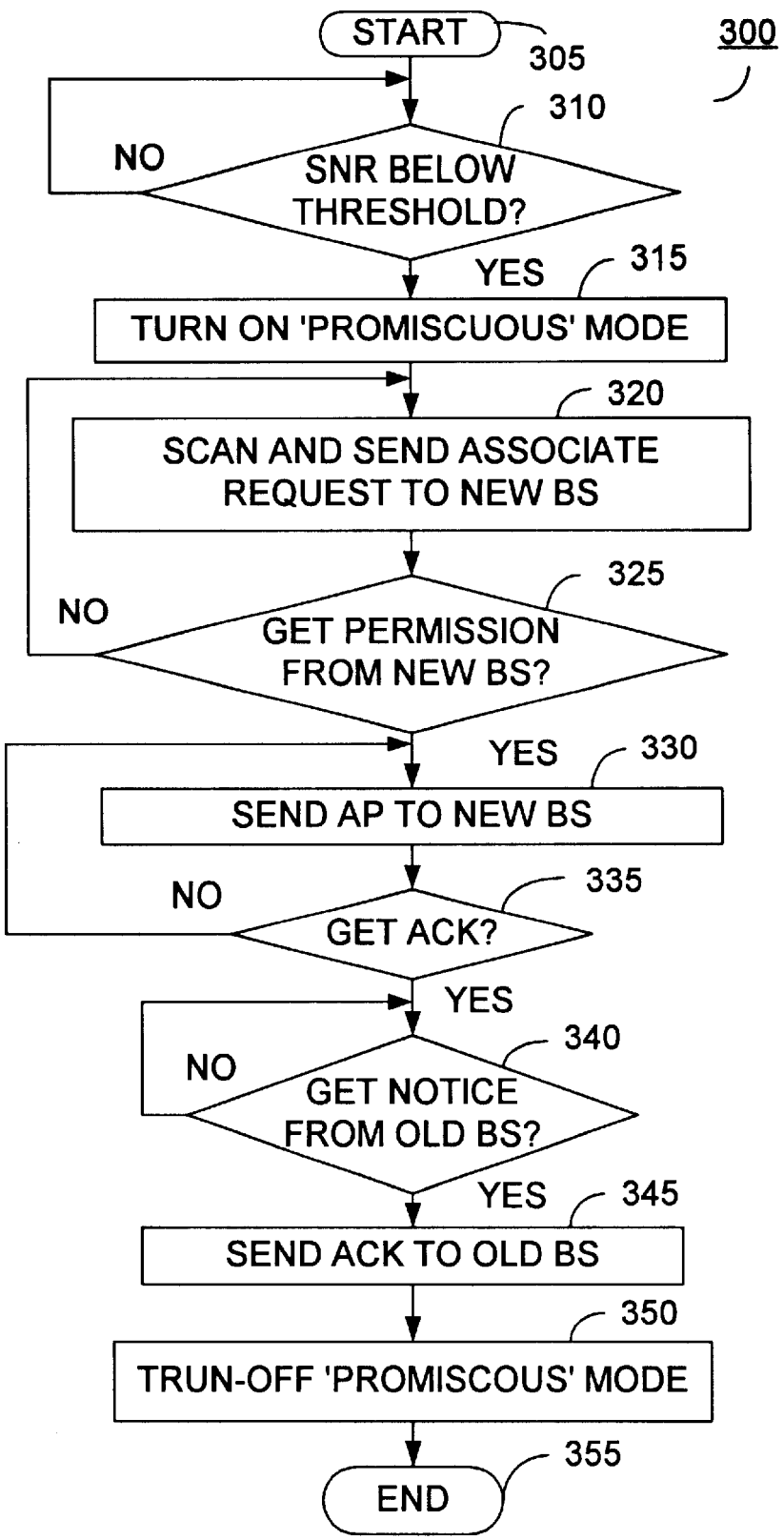
FIG. 3 is a flow diagram of the process carried out by a mobile terminal.

With reference to FIG. 3, there is shown flow diagram 300 that summarizes the foregoing discussion with respect the operation of mobile terminal (such as MT 101 of FIG. 1A) as it roams. After the "start event" depicted by processing block 305, the mobile terminal is continuously monitoring the incoming signal strength of the base station upon which it is presently homing to determine, as per decision block 310, if the signal-to-noise (SNR) falls below a prescribed threshold. If not, the mobile terminal continues to monitor the SNR. If the SNR is falls below the threshold, then processing block 315 is entered to turn on the promiscuous mode of the mobile terminal so that it may communicate with multiple base stations. Processing block 320 is invoked, whereupon the mobile terminal scans, using the physical layer, to locate a new base station and, once located, the mobile terminal sends a request to associate with the new base station. The new base station can either accept or reject the request to associate, as carried out by decision block 325. If rejected, the mobile terminal continues to scan. If accepted, the mobile terminal, via processing block 330, sends an active packet (AP) to the new base station so that the new base station may update the forwarding table. The new base station sends an acknowledgement (ACK) of receipt of the active packet. The mobile terminal awaits the ACK via decision block 335. Once the ACK is received, the mobile terminal awaits notification, as per decision block 340, that the forwarding table in the old base station has been updated by the active packet propagation process. Once notification is received, processing block 345 is invoked to send an acknowledgement to the old base station that the mobile terminal has been notified of the updating of the forwarding table in the old base station. The mobile terminal now turns off its promiscuous mode, as evidenced by processing block 350, and the handoff from the old base station to the new base station is now complete as per block 355.

Flow Diagram of Processing by All Possible New Base Stations

Figure 4:
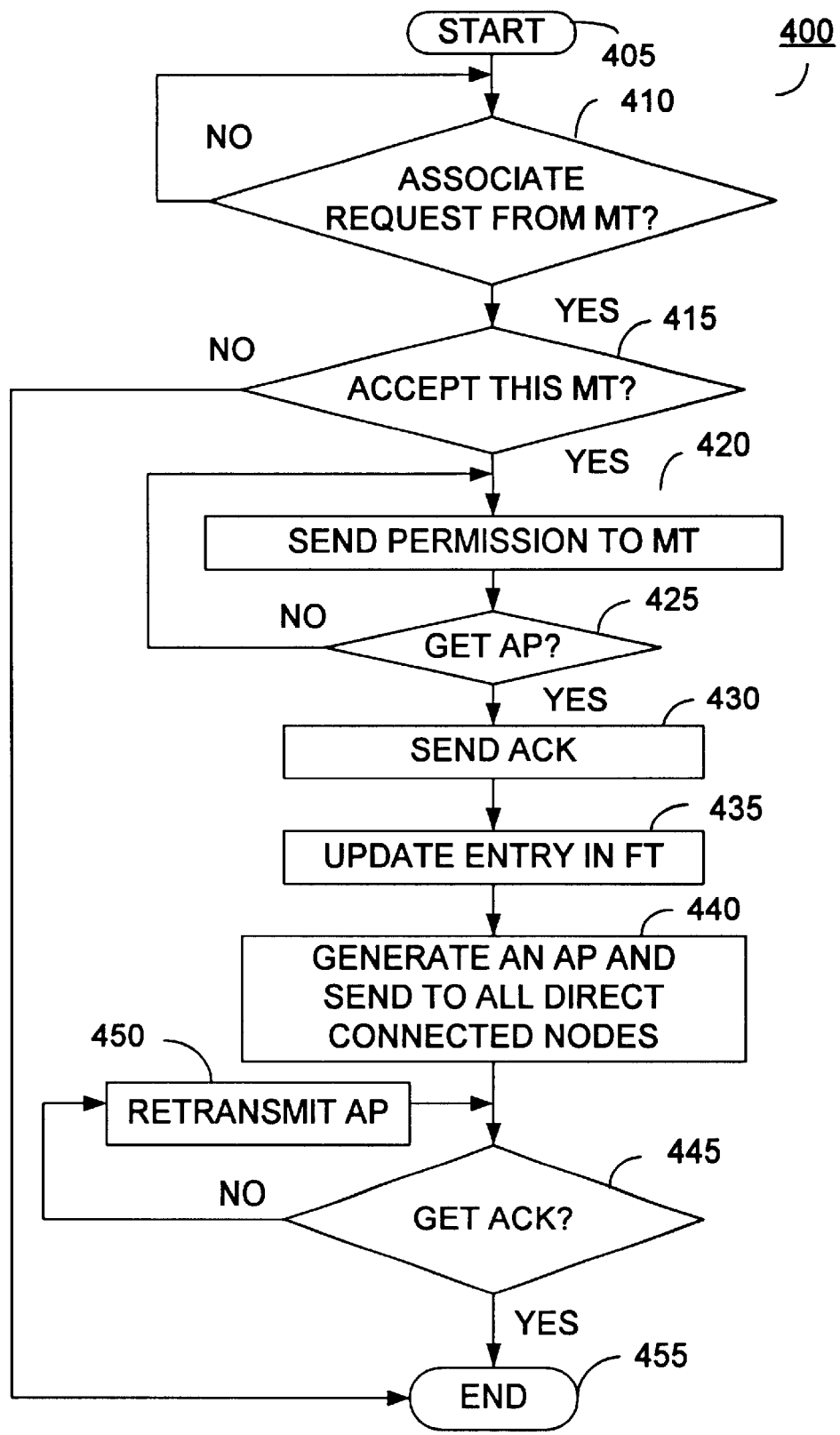
FIG. 4 is a flow diagram of the process carried out by any of the possible new base stations.

With reference to FIG. 4, there is shown flow diagram 400 that summarizes the foregoing discussion with respect to operation of possible new base stations (such as base stations 114 or 122 of FIG. 1A) participating in the scanning search by the mobile terminal (such as MT 101) as it roams. Upon start-up, as evidenced by processing block 405, the base station serving as possible new candidate upon which the mobile terminal may home, continually monitors, via decision block 410, for a request from a mobile terminal to associate with this particular base station. If the associate request is received, the possible new base station determines, in decision block 415, whether to accept or reject the associate request. If it rejects the request, then the processing for this phase is complete, as indicated by end block 455. On the other hand, if the new base station accepts the request to associate, it sends a permission-granted message to the mobile terminal via processing block 420. The new base station then awaits an incoming active packet as emitted by the mobile terminal; decision block 425 tests for the incoming active packet. The new base station sends permission periodically to the MT if the new base station does not receive the active packet. Once the active packet is received, processing block 430 is invoked to send an ACK to the mobile terminal. Next, processing block 435 is invoked to update the fields in the forwarding table entry in the new base station corresponding to the mobile terminal with information conveyed by the incoming active packet. Then, as per processing block 440, the new base station generates an outgoing active packet, which is an augmented version of the incoming active packet wherein the MT MAC ID is added to the data portion of the active packet, and sends the outgoing active packet to all nodes/devices directly connected to the new base station. To ensure that the outgoing active packet reaches the directly connected nodes, the new base station awaits ACKs from the nodes, as per decision block 445. If after a certain specified time any ACK is not received, the outgoing active packet is retransmitted via processing block 450 to those which do not send an ACK back. Once all ACKs are received, the processing for this phase of the operation by the new base station is complete. It is noted that only one base station, namely the new base station, executes processing blocks 420, 425, . . . , 450, and 455.

Flow Diagram of Processing by All Devices, Including Base Stations

Figure 5:
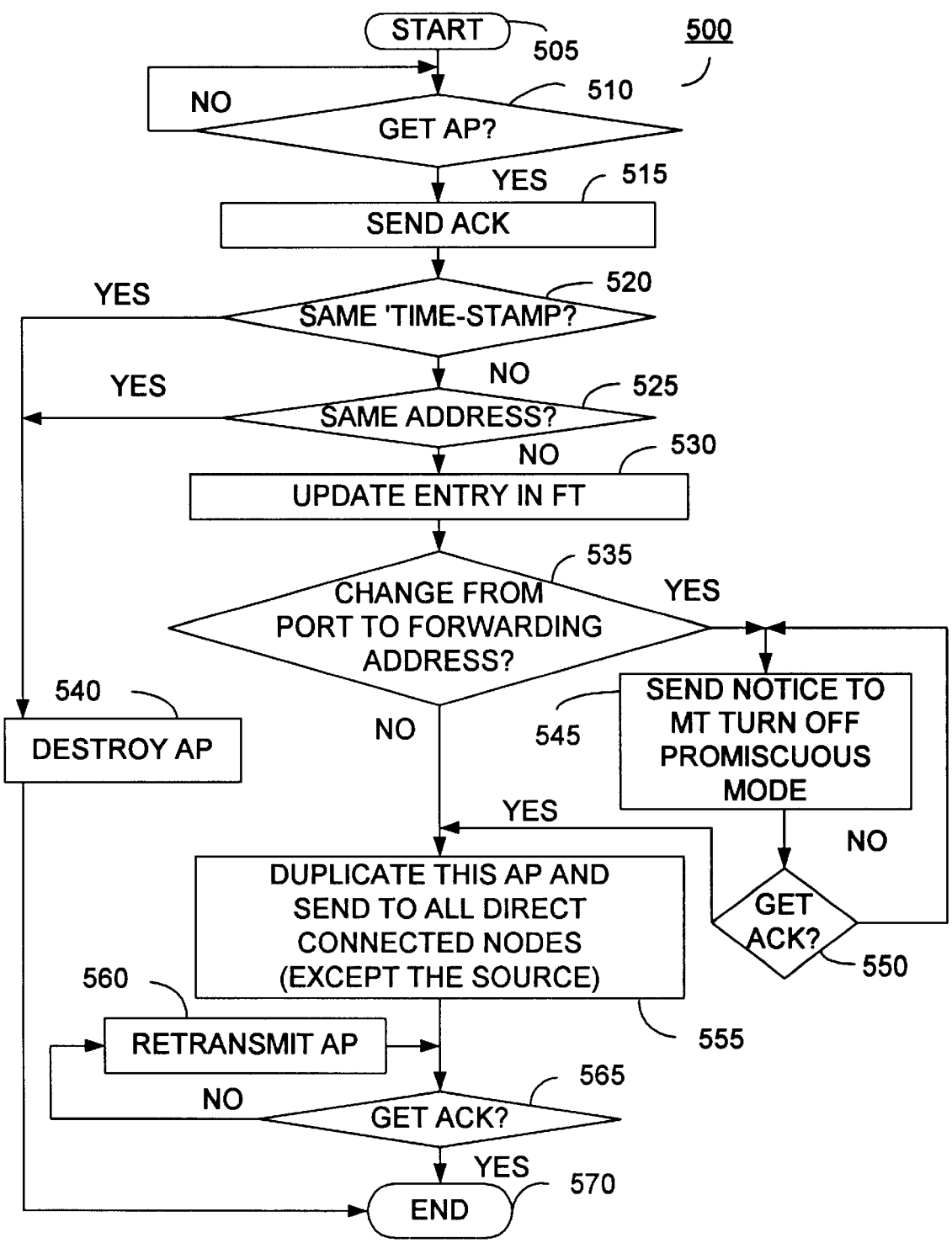
FIG. 5 is a flow diagram of the process carried out by all nodes in all LANs, including base stations.

With reference to FIG. 5, there is shown flow diagram 500 that summarizes the foregoing discussion with respect the operation of all devices, including each base station that does not become the new base station (such as base stations 112 or 123 of FIG. 1A) as the mobile terminal (such as MT 101) roams. Upon start-up, as evidenced by processing block 505, the decision block 510 is entered to determine when an active packet is received by the device under consideration. Once an active packet is received, then processing block 515 is invoked to send an ACK to the device from which the active packet was received. Next, the time-stamp conveyed by the arriving active packet is compared to the time-stamp field in the forwarding table for the MT MAC ID, via decision block 520, to determine if the forwarding table entry in the device under consideration needs updating. If the time-stamps are the same, then the arriving active packet is destroyed, as indicated by processing block 540, and processing by this device for this operational phase is terminated. On the other hand, if the time-stamps are different, then decision block 525 is entered to determine if the forwarding MAC ID in the forwarding table field for this MT MAC ID is the same or different than source MAC ID conveyed by the arriving active packet. If they are the same, then the arriving active packet is destroyed, and processing for this phase ceases at end block 570. However, if the forwarding MAC ID in the forwarding table field and the source MAC ID differ, then the forwarding MAC ID in the forwarding table is updated with the source MAC ID. The time stamp field is updated too. Next, decision block 535 is entered to determine if there is a need to change from a wireless port to a forwarding address; this applies when the active packet reaches the old base station. If a change is needed, processing by block 545 is invoked to send a notice to the MT to turn off the promiscuous mode. Once an ACK is received, as monitored by decision block 550, processing by block 555 is carried out next. If a change is not needed, then processing block 555 is entered directly. Processing by block 555 generates yet another active packet based upon the arriving active packet and then emits the generated active packet to all directly connected nodes, except for the node that originated the arriving active packet. Finally, via decision block 565 and retransmit processing block 560, the device under consideration awaits ACK messages from all directly connected devices.

Technique to Map an IP Address to a MAC ID

The processing technique for mapping an IP address to a MAC ID is illustrated by the following pseudo-code, that is, an IP packet serves as an input and the output is a MAC packet.

(a) search the forwarding table for a matching IP address
(b) if (port!=NIL)
   {generate a MAC packet (destination=MT MAC ID);
   send this MAC packet through the wireless port;
   }
else
   {generate a MAC packet (destination=forwarding MAC ID);
   send this MAC packet through the wired/backbone network;
   }

Format of an Active Packet Sent from the Mobile Terminal to the New Base Station The pictorial representation of FIG. 6 is the layout for active packet 600. As shown, the active packet generically has a MAC header composed of, at least, destination MAC address 610 and source MAC address 620, as well as an 'instruction portion' 630 and a 'data portion' 640.

Figure 7:
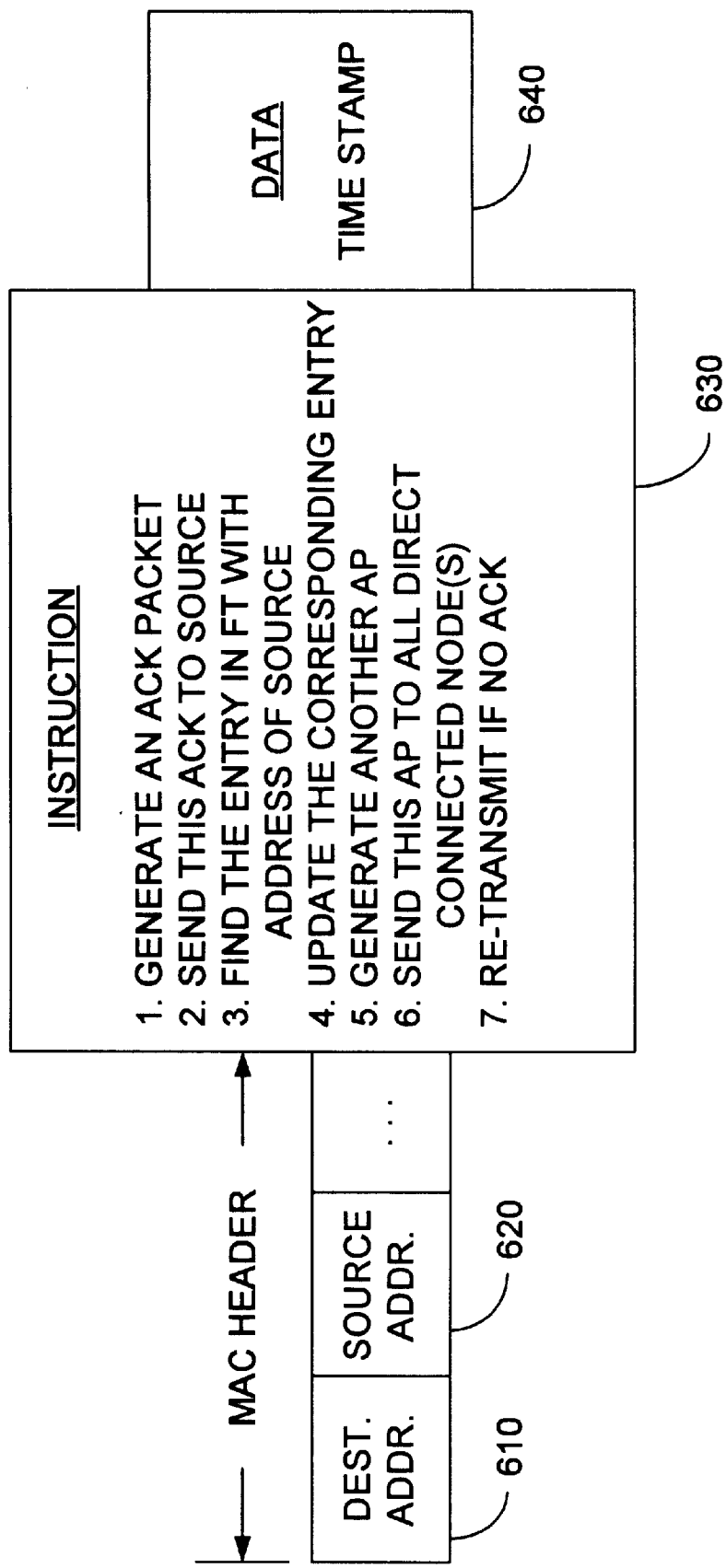
FIG. 7 is a layout of an active packet transmitted from a mobile terminal to a new base station.

The instruction portion for the case of the MT transmitting an active packet to the new base station for execution by the new base station is as follows:

1) generate an ACK packet
2) send this ACK to the source address in the header
3) find the entry in the forwarding table by looking at the first column for the MAC address of the source address in the header
4) update the corresponding entry in the forwarding table by:
   (i) updating forwarding MAC ID to NIL
   (ii) updating wireless port to port number
   (iii) updating time stamp with the one in the data portion
5) generate another active packet in the new base station
6) send this other active packet to all directly connected device(s), and
7) retransmit if ACKs not received from connected devices The data portion for this case is simply the Time Stamp.
The layout of FIG. 7 depicts the details of the instruction portion 630 and the data portion 640 of an active packet for the case of the MT transmitting an active packet to the new base station.

Format of an Active Packet Sent to Devices from Directly Connected Devices

The instruction portion for the case of an active packet being generated and forwarded by a given device to all other directly connected devices is as follows, wherein pseudo-code is used for conciseness:

1) generate an ACK
2) send this ACK to the source MAC address in the header
3) search first column of entry in the forwarding table having the MT MAC ID in the data portion
4) if [(same Time Stamp) or (forwarding MAC ID is same as source address in the header)]
   {destroy this packet;
   }
else
   {update the Time Stamp;
   if (forwarding MAC ID equals NIL)
      {update the forwarding MAC ID with address of the source in the header;

```
    update port to NIL;
    send notice to mobile terminal to turn off promiscu-
        ous mode;
    retransmit if no ACK received;
  }
  else
  {update the forwarding MAC ID with address of the
      source in the header;
  }
  generate an active packet and send to all other directly
      connected device(s) except the source;
  retransmit to those which do not send ACK back;
}
```

The data portion for this case includes: (a) MT MAC ID; and (b) the Time Stamp.

Figure 8:
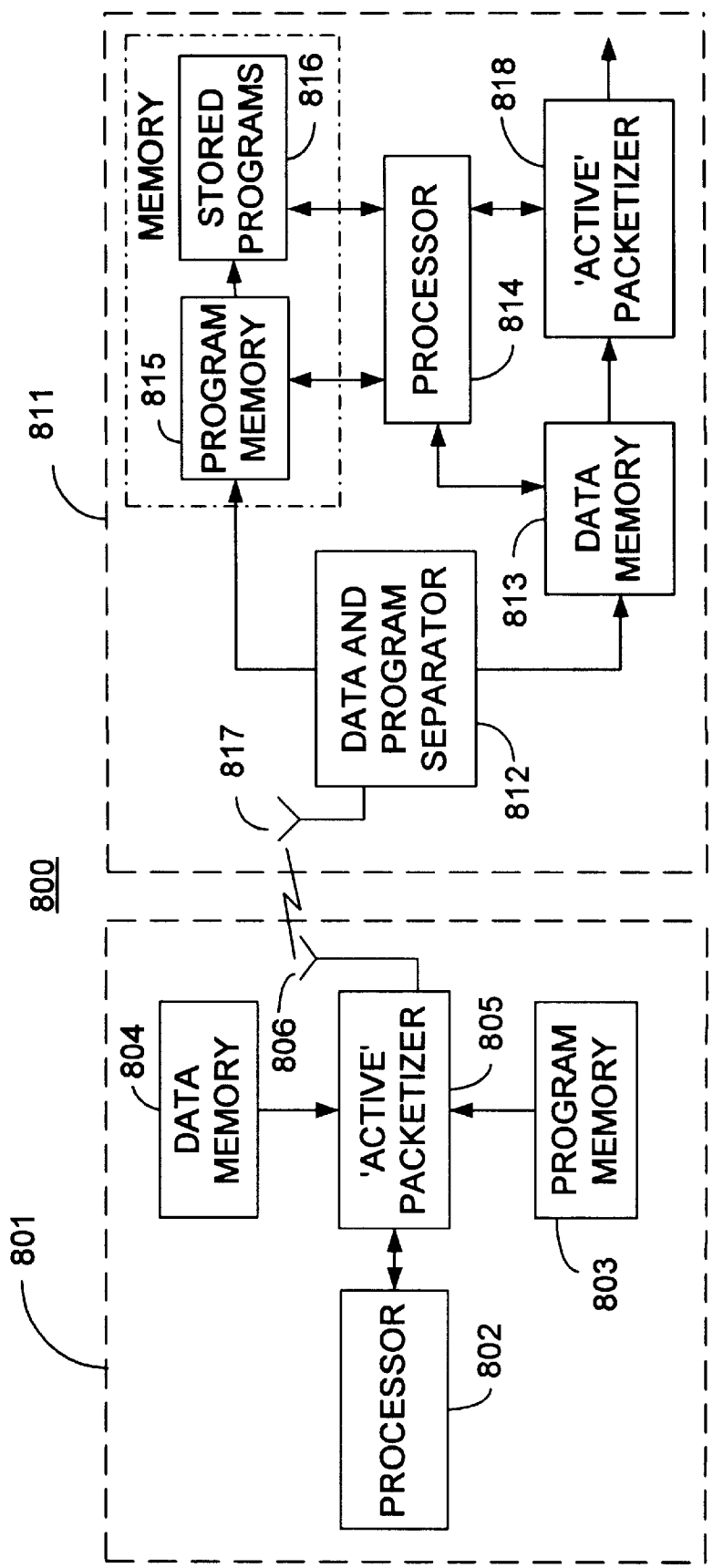
FIG. 8 is a block diagram of a mobile terminal in communication with a base station.

Block Diagram for Mobile Terminal and Device of the Illustrative Embodiment in Accordance with the Mobility Aspect of the Present Invention With reference to FIG. 8, there is shown a high-level block diagram 800 of mobile terminal 801 (being representative of either mobile terminal 101 or 201 of FIG. 1 or 2, respectively) for generating and conveying an active packet from terminal 801 to base station 811 (being representative of either BS 122 or 260 of FIG. 1 or 2, respectively). In particular, terminal 801 is composed of: processor 802; program memory 803; data memory 804; active packetizer 805; and over-the-air propagation device 806 (e.g., an antenna). It is recalled that an active packet may include a program portion and a data portion as per FIG. 6; program memory 803 provides the program portion and data memory 804 provides the data portion for each active packet. Active packetizer 805 places the active packet in the proper format for an over-the-air transmission protocol. Active packetizer 805, operating under control of processor 802, assembles the active packet and delivers the active packet to device 806 for propagation.

The high level block diagram of device 811 is composed of: data and program separator 812; data memory 813; processor 814; program memory 815; and stored programs memory 816. Device 811 delivers the incoming active packet received over-the-air by receiver 817 to separator 812. The program portion of the active packet is stored in program memory 815; in turn, program portion, being directly coupled to stored programs memory 816, can select the appropriate stored programs for execution is processor 814. Any data required by the execution of the stored programs can be obtained from data memory 813, which stores data for each corresponding program portion. In addition, device 811 may also need to emit an active packet to directly connected devices; 'active' packetizer 818 prepares the active packet in proper format for transmission to the directly connected devices.

Figure 9:
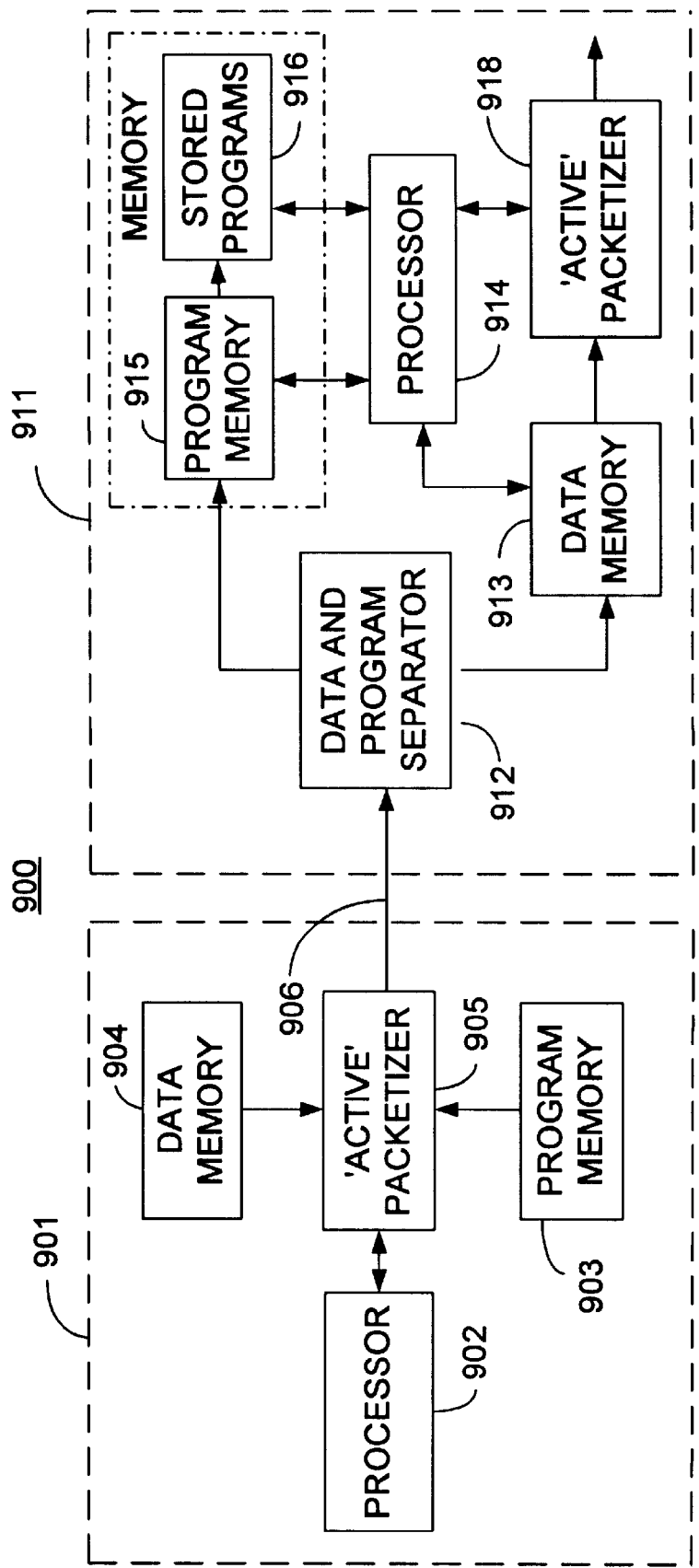
FIG. 9 is a block diagram depicting the connection of one device acting as a transmitter to other directly connected devices acting as receivers.

Block Diagram for Directly Connected Devices of the Illustrative Embodiment in Accordance with the Mobility Aspect of the Present Invention By analogy to circuitry 800 of FIG. 8, the circuitry 900 of FIG. 9 is used for sending an active packet from a device to other directly connected devices. The essential difference between circuitry 800 and circuitry 900 is that device 901 and device 911 are directly connected by path 906, that is, there is no over-the-air propagation path as in FIG. 8. Device 901 is a device (e.g., a base station) which functions as a "transmitter" to send an active packet to device 911 (e.g., a base station controller) directly connected to device 901. Device 911 functions as a "receiver" to process the incoming packet. Moreover, device 911 may also be required to emit active packets to devices, other than device 901, that are directly connected to device 911; 'active' packetizer 918 accomplishes this function.

Although various embodiments which incorporate the teachings of the present invention have been shown and described in detail herein, those skilled in the art can readily devise many other varied embodiments that still incorporate these teachings.

What is claimed is:

1. A method for managing the mobility of a wireless mobile terminal roaming in a domain of a network, the domain being composed of a plurality of subnets, each of the subnets serving a plurality of base stations, the mobile terminal initially being in communication with a first base station, the method comprising the steps of locating a second base station to directly communicate with the mobile terminal in place of the first base station, transmitting an outgoing active packet from the mobile terminal to the second base station, the active packet conveying a link layer identifier of the mobile terminal and a time stamp indicative of the time of origination of the outgoing active packet, receiving notification that the outgoing active packet has been received by the second base station, and cooperatively executing a mobility process in the base stations of each of the subnets in response to the outgoing active packet being received by the second base station, said step of executing including the steps of configuring the second base station with a forwarding table entry having a forwarding device link layer field and a time-stamp field and whenever the time stamp and the time-stamp field are different, updating the forwarding device link layer field and the time-stamp field with the time stamp, both with reference to the mobile terminal that has been passing between the base stations.

2. A method for managing the mobility of a wireless mobile terminal roaming in a domain of a network, the domain being composed of a plurality of subnets, each of the subnets serving a plurality of base stations, the mobile terminal initially being in communication with a first base station, the method comprising the steps of locating a second base station to directly communicate with the mobile terminal in place of the first base station, transmitting an outgoing active packet from the mobile terminal to the second base station, the active packet conveying a medium access control (MAC) identifier of the mobile terminal and a time stamp indicative of the time of origination of the outgoing active packet, receiving notification that the outgoing packet has been received by the second base station, and cooperatively executing a mobility process in the base stations of each of the subnets in response to the outgoing active packet being received by the second base station, said step of executing including the steps of configuring the second base station with a forwarding table entry having a forwarding link layer field and a time-stamp field and whenever the time stamp and the time-stamp field are different, updating the forwarding device link layer field and the time-stamp field with the time stamp, both with reference to the mobile terminal MAC identifier for the mobile terminal that has been passing between the base stations.

3. The method as recited in claim 2, wherein the step of executing further includes the step of comparing the time stamp conveyed by the outgoing active packet with the time-stamp field in the forwarding table entry to determine if there is a time difference.

4. A method for managing the mobility of a wireless mobile terminal roaming in a domain of a network, the domain being composed of a plurality of subnets, each of the subnets serving a plurality of base stations, the mobile terminal being initially in communication with a first base station, the method comprising the steps of locating a second base station to directly communicate with the mobile terminal in place of the first base station, the domain including a device directly connected to the second base station, transmitting an outgoing active packet from the mobile terminal to the second base station, receiving notification that the outgoing active packet has been received by the second base station, and cooperatively executing a mobility process in the base stations of each of the subnets in response to the outgoing active packet being received by the second base station, said step of executing including the steps of transmitting a second active packet from the second base station to the device with reference to the outgoing active packet, the second active packet including a link layer identifier of the mobile terminal and a time stamp indicative of the time of origination of the outgoing active packet, configuring the device with a forwarding table entry having a forwarding device link layer field and a time-stamp field, and whenever the time stamp and the time-stamp field are the same, inhibiting further processing of the second active packet by the device.

5. A method for managing the mobility of a wireless mobile terminal roaming in a domain of a network, the domain being composed of a plurality of subnets, each of the subnets serving a plurality of base stations, the mobile terminal being initially in communication with a first base station, the method comprising the steps of locating a second base station to directly communicate with the mobile terminal in place of the first base station, the domain including a device directly connected to the second base station, transmitting an outgoing active packet from the mobile terminal to the second base station, receiving notification that the outgoing packet has been received by the second base station, and cooperatively executing a mobility process in the base stations of each of the subnets in response to the outgoing active packet being received by the second base station, said step of executing including the steps transmitting a second active packet from the second base station to the device with reference to the outgoing active packet, the second active packet including a link layer identifier of the second base station, a link layer identifier of the mobile terminal, and a time stamp indicative of the time of origination of the outgoing active packet, configuring the device with a forwarding table entry having a forwarding device link layer field and a time-stamp field corresponding to the link layer of the mobile terminal, whenever the time stamp and the time-stamp field are different, comparing the forwarding device link layer field in the forwarding table entry with the link layer identifier of the second base station, and whenever the forwarding device link layer field and the link layer field of the second base station are the same, inhibiting further processing of the second active packet by the device.

6. The method as recited in claim 5 wherein the step of executing further comprises whenever the forwarding device link layer field and the link layer identifier of the second base station are different, updating the forwarding table entry by inserting the link layer identifier of the second base station into the forwarding device link layer field.

7. A method for managing the mobility of a wireless mobile terminal roaming in a domain of a network, the domain being composed of plurality of subnets, each of the subnets serving a plurality of base stations, the mobile terminal initially being in communication with a first base station, the method comprising the steps of locating a second base station to directly communicate with the mobile terminal in place of the first base station, the domain including a plurality of devices directly connected to the second base station, transmitting an outgoing active packet from the mobile terminal to said second base station, receiving notification that the outgoing packet has been received by the second base station, and cooperatively executing a mobility process in the base stations of each of the subnets in response to the outgoing active packet being received by the second base station, said step of executing including the step of transmitting a second active packet from the second base station to each of the devices, said second active packet including a link layer identifier of the mobile terminal and a time stamp indicative of the time of origination of the outgoing active packet, said step of executing further including the steps in each of the devices of configuring each of the devices with a forwarding table entry having a forwarding device link layer field and a time-stamp field corresponding to the link layer identifier of the mobile terminal, and whenever the time stamp and the time-stamp field are the same, inhibiting further processing of the second active packet by each of the devices.

8. The method as recited in claim 7, wherein the step of executing further includes whenever the time stamp and the time-stamp field are different, comparing the forwarding device link layer field in the forwarding table entry with the link layer identifier of the second base station, and whenever the forwarding device link layer field and the link layer identifier of the second base station are the same, inhibiting further processing of the second active packet by each of the devices.

9. The method as recited in claim 7, wherein the step of executing further includes whenever the time stamp and the time-stamp field are different, comparing the forwarding device link layer field in the forwarding table entry with the link layer identifier of the second base station, and whenever the forwarding device link layer field and the link layer identifier of the second base station are different, updating the forwarding table entry by inserting the link layer identifier of the second base station into the forwarding device link layer field.

10. A method for managing the mobility of a wireless mobile terminal roaming in a domain of a network, the domain being composed of a plurality of subnets, each of the subnets serving a plurality of base stations, the mobile terminal initially being in communication with a first base station, the method comprising the steps of locating a second base station to directly communicate with the mobile terminal in place of the first base station, the domain including a first device directly connected to the second base station and a second device directly connected to the first device, transmitting an outgoing active packet from the mobile terminal to the second base station, receiving notification that the outgoing packet has been received by the second base station, and cooperatively executing a mobility process in the base stations of each of the subnets in response to the outgoing active packet being received by the second base station, said step of executing further including the steps of transmitting a second active packet from the second base station to the first device with reference to the outgoing active packet and transmitting a third active packet from the first device to the second device with reference to the second active packet.

11. The method as recited in claim 10 wherein the step of executing includes the steps of configuring the first device with a first forwarding table entry and the second device with a second forwarding table entry corresponding to a link layer identifier of the mobile terminal, and updating the first forwarding table entry in response to the second active packet and the second forwarding table entry in response to the third active packet.

12. A method for managing the mobility of a wireless mobile terminal moving in a domain of a communication system expressed in terms of the Open System Interconnection (OSI) layers, the domain being composed of a plurality of subnets, each of the subnets serving a plurality of base stations, the mobile terminal initially being in communication with a first base station and the domain including a device directly coupled to the first base station, the method comprising the steps of scanning the domain using an algorithm carried out at an OSI physical layer for a second base station to directly communicate with the mobile terminal in place of the first base station, transmitting an outgoing active packet from the mobile terminal to the second base station, receiving notification that the outgoing active packet has been received by the second base station, and cooperatively executing a mobility process in the base stations of each of the subnets in response to the outgoing active packet being received by the second base station, said step of executing including the step of sending a second active packet to the first base station from the device as a step in the mobility process, the second active packet conveying a link layer identifier of the device, a link layer identifier of the mobile terminal, and a time stamp indicative of the time of origination of the outgoing active packet sent from the mobile terminal to the second base station, and the step of executing further including the steps of configuring the first base station with a forwarding table entry having a forwarding device link layer field and a tie-stamp field corresponding to the link layer identifier of the mobile terminal, comparing the time stamp conveyed by the second packet with the time-stamp field in the forwarding table entry to determine if there is a time difference, if there is a time difference, comparing to determine if there is a device difference between the forwarding device link layer field with the link layer identifier of the device conveyed by the second active packet, and if there is a device difference, updating the time-stamp field with the time stamp conveyed by the second active packet and the forwarding device link layer field with the link layer identifier of the device with reference to the link layer identifier of the mobile terminal.

13. The method as recited in claim 12 wherein the forwarding table entry includes a wireless port field, and the step of updating includes the step of updating the wireless port field with reference to the link layer identifier of the mobile terminal.

14. The method of claim 12 wherein the mobile terminal has a network layer address and the forwarding table entry includes a network layer field, and the step of updating includes the step of ensuring the network layer field corresponds to the network layer address for the given link layer identifier of the mobile terminal.

15. The method of claim 12 wherein the first base station sends an outbound active packet to the mobile terminal to disable the step of scanning.

* * * * *